United States Patent [19]

Fleming et al.

[11] Patent Number: 5,796,108

[45] Date of Patent: Aug. 18, 1998

[54] ALPHA-BETA RADIATION DETECTOR

[75] Inventors: Dale M. Fleming, Richland; Kevin L. Simmons, Kennewick; Thomas J. Froelich, West Richland; Gregory L. Carter, Richland, all of Wash.

[73] Assignee: Battelle Memorial Institute, Richland, Wash.

[21] Appl. No.: 724,534

[22] Filed: Sep. 30, 1996

[51] Int. Cl.[6] .................... G01T 1/20; G01V 5/02
[52] U.S. Cl. ............ 250/368; 250/253; 250/361 R
[58] Field of Search .................... 250/361 R, 368, 250/253

[56] References Cited

U.S. PATENT DOCUMENTS 2,841,715  7/1958  Schultz ........................... 250/368
5,006,713  4/1991  Miller et al. .................. 250/361 R

FOREIGN PATENT DOCUMENTS 55-82070  6/1980  Japan ............................ 250/368
691925    5/1953  United Kingdom ........... 250/361 R

*Primary Examiner*—Edward J. Glick
*Attorney, Agent, or Firm*—Paul W. Zimmerman

[57] ABSTRACT

The invention is based in part on the discovery that a plastic housing that is lightweight is surprisingly efficient inasmuch as background signals from any gamma radiation are significantly reduced by using a plastic housing instead of a metal housing. A further aspect of the present invention is the profile of the housing as a bi-linear approximation to a parabola resulting in full optical response from any location on the scintillation material to the photomultiplier tube. A yet further aspect of the present invention is that the survey probe is resistant to magnetic fields. A yet further aspect of the present invention is the use of a snap-fit retaining bracket that overcomes the need for multiple screws.

40 Claims, 6 Drawing Sheets

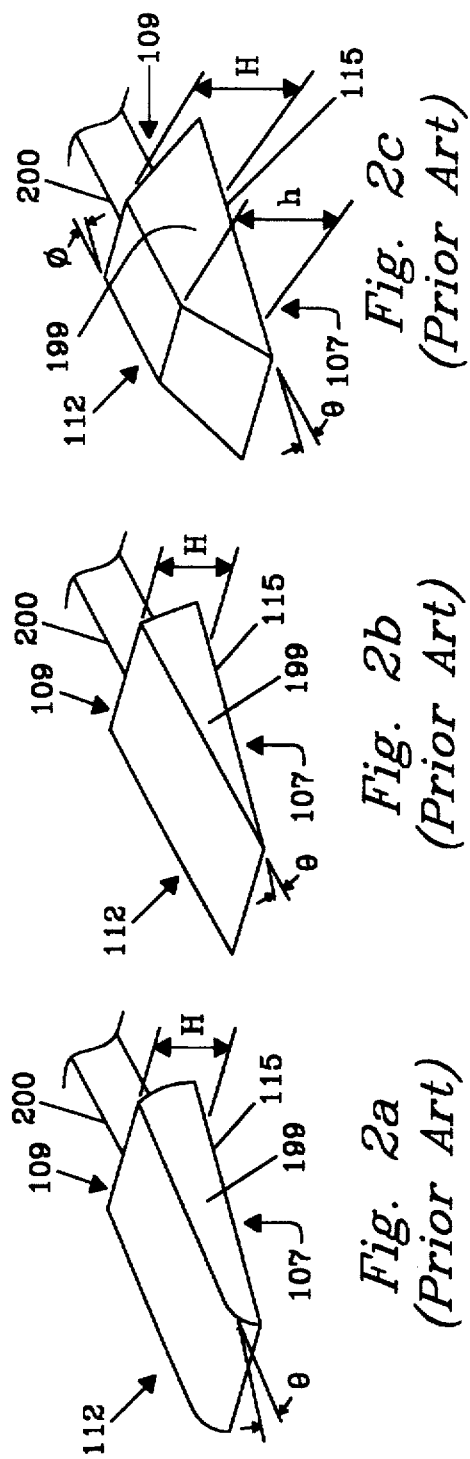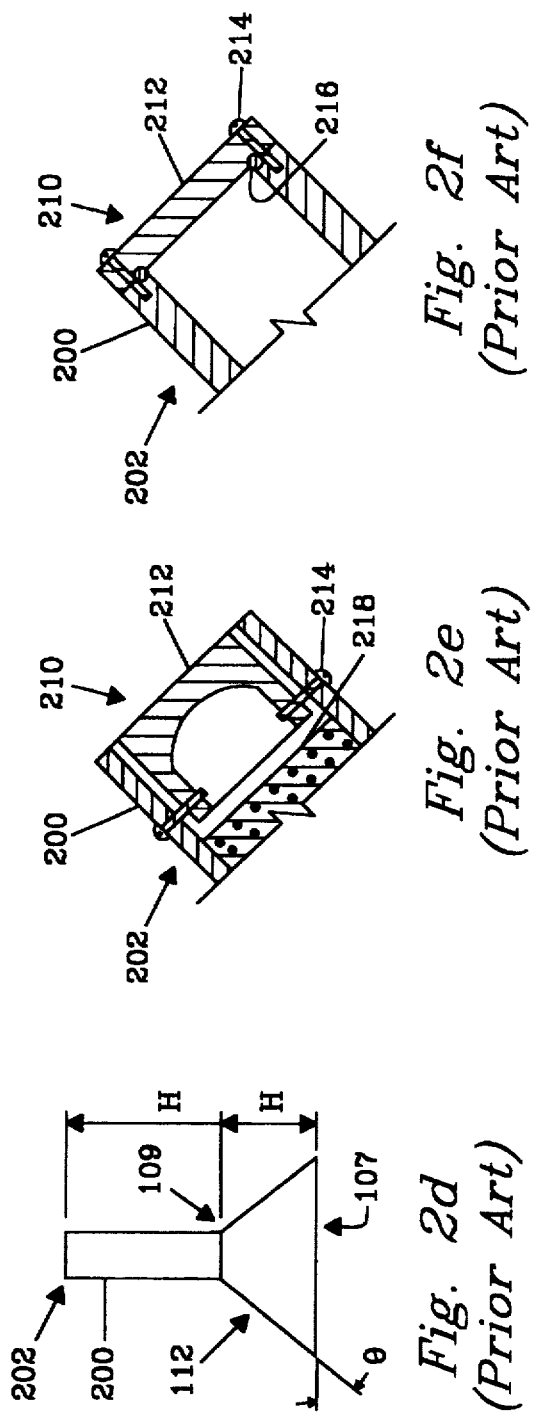
Fig. 2a (Prior Art)
Fig. 2b (Prior Art)
Fig. 2c (Prior Art)
Fig. 2d (Prior Art)
Fig. 2e (Prior Art)
Fig. 2f (Prior Art)

ALPHA-BETA RADIATION DETECTOR

This invention was made with Government support under Contract DE-AC06 76RLO 1830 awarded by the U.S. Department of Energy. The Government has certain rights in the invention.

FIELD OF THE INVENTION

The present invention relates generally to an apparatus for detecting alpha and/or beta radiation. More specifically, the present invention relates to a survey probe for surveying personnel and/or structures for the presence of alpha and/or beta radiation.

BACKGROUND OF THE INVENTION

Surveying personnel and structures (e.g. building walls, floors, tables, and equipment) for radiation contamination has been ongoing since the routine production and handling of radioactive materials. Health protection technicians routinely use monitors consisting of a survey probe and count rate meter for the surveys.

Several survey probes have been manufactured and used routinely over the years. Survey probes (FIG. 1) commonly have a scintillation material 100 that emits a photon upon interaction with an alpha or beta particle. For detection of alpha particles, a scintillator, typically zinc sulfide, is deposited on the face 102 of a plastic sheet 104 that is about 1/16 in thick. The face 102 of the plastic sheet 104 is covered with a thin aluminum coated plastic (polyester or polycarbonate) sheet 106. The aluminum coating is opaque and reflective preventing passage of natural or room light through the survey probe face 107. Because the aluminum coated plastic sheet 106 is fragile, a protective grid or screen 108 is placed over the aluminum coated plastic sheet 106 to protect it from abrasion and tearing during surveying as the face or window 107 is passed over surfaces which are often not geometrically flat or uniform. For beta probes, the plastic sheet 104 is replaced with a plastic scintillator (1/32 in) thicker than the zinc sulfide to interact with the beta particles. For a combination alpha and beta detector, the plastic scintillator may be coated with the alpha sensitive zinc sulfide. The protective grid 108, aluminum coated plastic sheet 106, and scintillation material 100 are collectively referred to as a survey probe face assembly 110.

The survey probe face assembly 110 is attached by screws 111 to the bottom 115 of a probe housing 112 with a retaining bracket 114 that holds the periphery of the survey probe face assembly 110. A photo multiplier tube 116 penetrates the housing 112 to receive light signals from the scintillation material 100. The housing 112 completely surrounds the scintillation material 100 and light tightness is maintained by a gasket 118 between the housing 112 and the scintillation material 100. In some designs, the gasket 118 may be between the grid 108 and the aluminum coated plastic sheet 106, or between the retaining bracket 114 and the grid 108.

Several commercially available (prior art) survey probes are shown in FIG's 2a, 2b, 2c, and 2d. The area of the face or window 107 is typically about 100 cm² to achieve the desired sensitivity. Sides 199 extend from the top 113 to the bottom 115. Housing geometry varies according to nose angle θ (Theta), and heel height H. Survey probes are designed to be held by the cylindrical housing or handle 200 which contains the photomultiplier tube 116 and extends from the heel 109 of the housing 112. Ideally, the housing 112 should be configured to permit light from any position on the scintillator material 100 to reach the photomultiplier tube 116.

The survey probe in FIG. 2a is a Bicron AB 100, Bicron-NE, Solon, Ohio, and includes a plastic monolith (not shown) that is in contact with the back side of the scintillation material and the photo multiplier tube 116. The plastic monolith is a light pipe that conducts light signals from the scintillator material 100 via internal reflection to the photomultiplier tube 116. That plastic monolith in combination with the metal housing 112 makes the Bicron AB 100 heavy, approximately 3–4 pounds. However, the plastic monolith makes the survey probe very efficient for radiation surveys inasmuch as light from any position on the face or window 107 is conducted to the photo multiplier tube 116.

The survey probe in FIG. 2b is an NE DP6BD, Bicron-NE, Solon, Ohio, which is hollow, omitting the plastic monolith and thereby lighter. Nevertheless, with the aluminum housing 112, the survey probe weighs about 1–2 pounds. The housing 112 is coated on the inside surface with white paint to provide a light reflective coating. The lack of a light pipe in combination with the shallow nose angle θ, causes the NE DP6BD to have less response from scintillations occurring near the nose.

The survey probe in FIG. 2c is Ludlum 43-89, Ludlum Measurements, Sweetwater, Tex. The combination of a steeper nose angle θ with a top angle Φ (phi) makes this survey probe more efficient inasmuch as scintillations from any location on the scintillation material 100 are efficiently detected. In fact the optical performances of this survey probe and of the Bicron (FIG. 2a) are nearly identical. However, the improved detection efficiency sacrifices weight and physical access to crevices or through narrow gaps between elements of equipment because the heel height H is substantially greater for the Ludlum 43-89 than for other survey probes. The housing 112 is made of welded aluminum and the survey probe weighs about 2–3 pounds.

The survey probe in FIG. 2d is a Ludlum 43-1-1. Again, efficient light detection sacrifices weight and physical access. The housing 112 is welded cast aluminum and the survey probe weighs about 2–3 pounds.

Another aspect of the prior art is detailed in FIG's 2e and 2f. The closure 210 is a cover 212 mounted with screws 214 on the second end 202 of the cylindrical housing 200. The screws 214 penetrate the cylindrical housing 200. Light tightness is achieved with a gasket 216 or a foam packing 218. Disadvantages of the prior art include abrasion of a person's hand with laterally mounted screws (FIG. 2e), and difficulty of matching holes between the cover 212 and the cylindrical housing 200 for longitudinally mounted screws (FIG. 2f).

The weight of the survey probe is important for health protection technicians who carry a survey probe nearly continuously during their work day and must often reach overhead or laterally extended to perform a radiation survey. Accordingly, fatigue and muscle tension contribute to reduced effectiveness of the individual performing the survey.

SUMMARY OF THE INVENTION

The invention is based in part on the discovery that a plastic housing that is lightweight is surprisingly efficient inasmuch as background signals from any gamma radiation are significantly reduced by using a plastic housing instead of a metal housing. A further aspect of the present invention is the profile of the housing as a parabolic profile. The parabolic profile is a bi-linear approximation to a parabola resulting in full optical response from any location on the scintillation material to the photo multiplier tube, and having a heel height that is less than any of the commercially available survey probes. A yet further aspect of the present invention is that the survey probe is resistant to magnetic fields and able to meet the ANSI N42.17A standard that has heretofore not been met by any commercially available survey probe. A yet further aspect of the present invention is the use of a snap-fit retaining bracket that overcomes the need for multiple screws. An advantage of eliminating the screws is eliminating or reducing small crevices that may become radioactively contaminated during a radiation survey. Further the absence of screws and screw holes facilitates cleaning or removal of the radioactive contamination.

It is an object of the present invention to provide a lightweight ionizing radiation survey probe useful to radiation protection technicians.

It is a further object of the present invention to provide a reduced cost ionizing radiation survey probe for use by radiation protection technicians.

It is a further object of the present invention to provide a compact ionizing radiation survey probe that can fit into tight crevices.

It is a yet further object of the present invention to provide an ionizing radiation survey probe with a face shape and area that provides adequate sensitivity to detect spot sources of ionizing radiation.

It is another object of the present invention to provide an ionizing radiation survey probe that is more easily cleaned of radioactive contamination.

It is yet another object of the present invention to provide an ionizing radiation survey probe having less sensitivity to interfering signals from background gamma radiation.

It is yet another further object of the present invention to provide a closure for the cylindrical housing that is easier to fabricate and more reliably light tight.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 2a is an isometric view of a Bicron ionizing radiation survey probe (prior art).

FIG. 2b is an isometric view of an NE ionizing radiation survey probe (prior art).

FIG. 2c is an isometric view of an Ludlum 43-89 ionizing radiation survey probe (prior art).

FIG. 2d is an isometric view of a Ludlum 43-1-1 ionizing radiation survey probe (prior art).

FIG. 2e is a cross section of a laterally held closure (prior art).

FIG. 2f is a cross section of a longitudinally held closure (prior art).

Description of the Preferred Embodiment(s)

Figure 1:
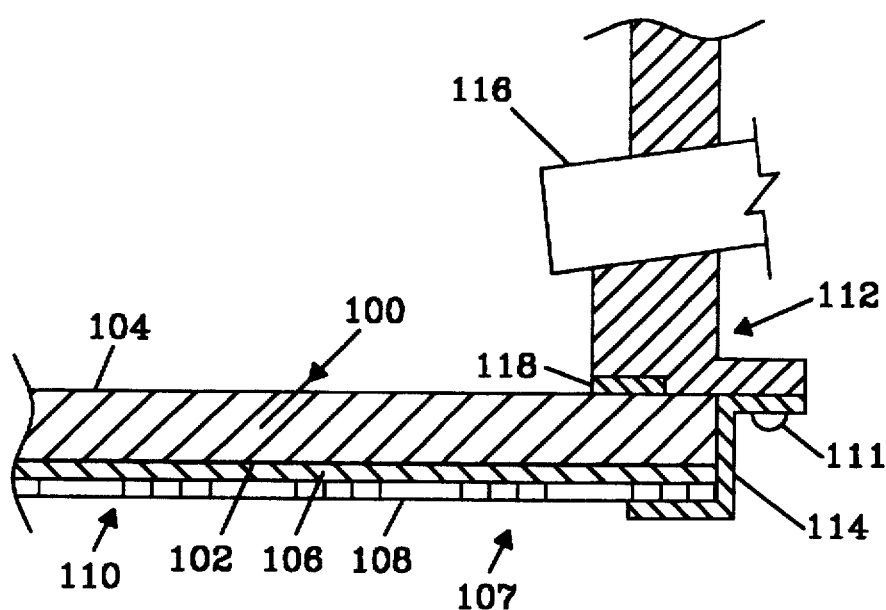
FIG. 1 is a cross section of a portion of an ionizing radiation survey probe (prior art).

The invention is several improvements to a survey probe for surveying ionizing radiation. As described in the Background, a survey probe has:

(a) a housing having a top, a nose, a bottom, sides and a heel, the top extending from the nose at a nose angle to the heel, and the sides extending from the top to the bottom, an interior surfaces of the top, nose, heel and sides optically reflective;

(b) a face having a scintillation material made of a plastic sheet coated with a scintillator on a sheet face of the plastic sheet, the sheet face covered with a thin metallic sheet;

(c) a retaining bracket holding the face onto the bottom of the housing together with a gasket between the retaining bracket and the face;

(d) a protective grid or screen placed over the thin metallic to protect it from abrasion and tearing during surveying as the face of the survey probe is passed over surfaces which are often not geometrically flat or uniform; and (e) a cylindrical housing containing a photomultiplier tube, the cylindrical housing attached to the heel and the photomultiplier tube extending to at least flush with the internal surface of the heel, the cylindrical housing having a closure on a second end.

The several improvements of the present invention contribute to increased radiation sensitivity and include, (1) the housing made of an optically opaque plastic, (2) the retaining bracket made of an optically opaque plastic, (3) the housing and the bracket are attached with a snap-fit independent of the materials of construction, (4) a heel collar attached to the heel of the housing for receiving the cylindrical housing, (5) the heel collar made of an optically opaque plastic, (6) the top having a bi-linear profile approximating a parabola, (7) an o-ring holder for the photomultiplier tube, (8) a two-part closure for the cylindrical housing, and (9) mu-metal surrounding the photomultiplier tube within the cylindrical housing.

The optically opaque plastic is preferably a plastic base mixed with carbon black. The carbon black is in an amount from about 1 wt % to about 10 wt %. Below about 1 wt %, the carbon black is insufficient to make the plastic base optically opaque. In addition, mixing is difficult and may result in a visible swirling or other inhomogeneity. The upper limit of 10 wt % is only for cost considerations. As a practical matter, more carbon black may be used up to a limit of moldability of the mixture, especially if there was further advantage in radiation effects that would increase accuracy of the survey probe. Preferred amount of carbon black are from about 4 wt % to about 6 wt %. In addition to optical opacity, the plastic base must be dimensionally stable and radiation resistant. Accordingly, the plastic base is selected from the group consisting of Acrylonitrile Butadiene Styrene (ABS), High Density Polyethylene (HDPE), polysulfone, epoxy, and combinations thereof. Plastic was selected initially as an effort toward weight reduction. It unexpectedly resulted in reduced gamma radiation background signals. It is hypothesized that the reduced "Z" of the plastic permits the gamma radiation to pass through the housing and scintillation material without creating a scintillation.

Another concern that arose with respect to the plastic housing was an increase in background signal from radon that was attracted by static electricity. An anti-static compound was added to the plastic which greatly reduced or eliminated background signals from radon. The amount of anti-static compound may range from about 1 wt % to about 6 wt % with about 4 wt % preferred. Any anti-static compound may be used, for example Armastat 550, from Akzo, Chicago, Ill.

The inside surfaces may be made optically reflective in many ways including cutting and placing reflective silvered glass mirror, reflective foil, or reflective coating upon the interior surfaces, for example reflective paint or electroplating (e.g. chrome on ABS). It was found that a silver-chrome paint available at auto parts stores is sufficiently reflective of the scintillating light spectrum and inexpensive to apply to the interior surfaces.

The thin metallic sheet may be a metal foil, or preferably is a plastic sheet with a metallized coating, for example a polyester or polycarbonate with an aluminum coating. Thin is preferably less than about 0.020 in. and most preferably less than about 0.010 in.

Figure 3:
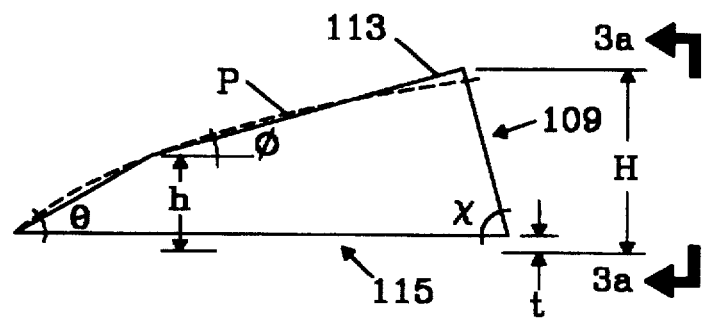
FIG. 3 is a side view of the profile of the housing.
Figure 3A:
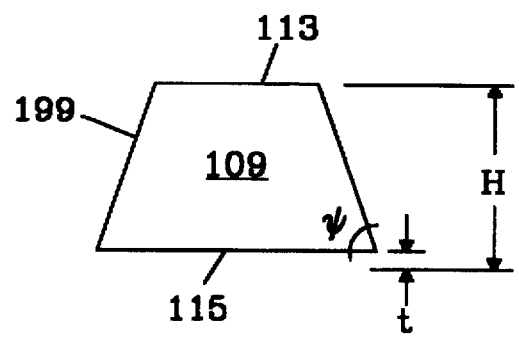
FIG. 3a is a heel end view of the profile of the housing.

Optically, the Ludlum (FIG. 2d) provides the best, most complete transfer of optical energy from the scintillation material to the photomultiplier tube. However, it sacrifices ergonomic comfort and ability to survey into crevices. Maintaining ergonomic comfort and a low heel height as well as maintaining good transfer of optical energy from all positions on the scintillation material is achieved by making the top of the head in the shape of a bi-linear profile as shown in FIG. 3. More specifically, it is preferred that the bi-linear profile approximates a parabola P. Yet further, the bi-linear profile has a nose angle θ of between about 25 degrees and 36 degrees (preferably about 31 degrees) extending to a first height h of between about ¾ in and 1 ¼ in (preferably about ⅞ in), and a second angle Φ between about 10 degrees and 20 degrees (preferably about 16 degrees) extending to a heel height H between about 1 ½ in and 2 ¼ in (preferably about 1 ⅞ in). A heel angle χ (chi) is between about 65 degrees and 85 degrees (preferably about 75 degrees). Thickness t is the distance from a bottom of the retaining bracket 114 (not shown in FIG. 3) to the bottom 113 of the housing 112. Sides 199 extending from the top 113 to the bottom 115 make a side angle ψ (psi) between about 60 and 80 degrees (preferably about 71 degrees).

Figure 4:
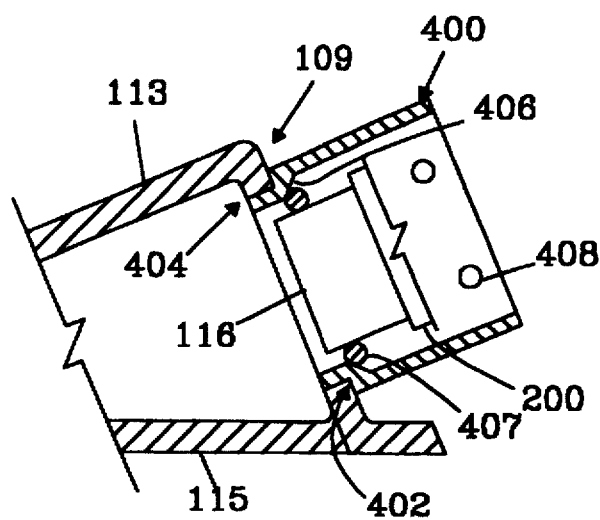
FIG. 4 is a cross section of a heel collar connected to the heel of the housing.

In FIG. 4, a heel collar 400 is attached to the heel 109 for receiving a cylindrical housing 200 (FIG. 2a). The cylindrical housing 200 is an aluminum tube open at the end inserted into the heel 109 to permit the photomultiplier tube 116 to "see" within the housing 112, and closed at the opposite end to be light tight. Alternatively, the cylindrical housing 200 may be an optically opaque plastic. Further, the heel collar 400 may be extended to include the cylindrical housing 400 as a single integral part. Moreover, the cylindrical housing 200, heel collar 400 and housing 112 may be molded as an integrated part.

The heel collar 400 preferably has a step 402 to mate with an opening 404 in the heel 109. Internally, the heel collar 400 preferably has a chamfer 406 for sealing against an o-ring 407 on the photomuliplier tube 116 thereby contributing to radiation sensitivity by ensuring light tightness. Tapped holes 408 may be provided with set screws to hold the cylindrical housing 200. The heel collar 400 may be made from any dimensionally stable, radiation resistant material. However, in a preferred embodiment, the heel collar 400 is made from optically opaque plastic. The heel collar 400 is preferably glued to the heel 109.

In the prior art survey probes (FIG's 2a–2d), the retaining bracket 108 was held to the housing 112 by screws 111. In order to reduce the cost of manufacture and assembly, the screws are eliminated in the present invention. Instead, the retaining bracket 108 attaches to the housing 112 in a snap-fit relationship. It will be apparent to one skilled in the art of plastics molding of parts for snap-fit relationships that many options are available. One option, tongue and groove is preferred. In the present invention, the tongue is on the housing and the groove is on the retaining bracket. However, the snap-fit may be made with the groove on the housing and the tongue on the retaining bracket. The snap-fit may be permanent or temporary. With the tongue and groove both extending around the full periphery of the parts, the snap-fit is permanent meaning that the parts cannot be disassembled without damaging at least one of the parts. It is preferred that the snap-fit be temporary so that the two parts may be disassembled. The snap-fit is made temporary by having the tongue only on the straight edges of the part and tapering away toward the corners so that a segment of the straight edge and all of the corner has no tongue thereby permitting disassembly by bending the retaining bracket away from the housing at the corners. Other snap-fit embodiments are possible including holes and protrusions. Alternatively, quick release devices may be employed, for example buckles. However, it is believed that quick release devices add to the cost of manufacture and are therefore not preferred.

Figure 5:
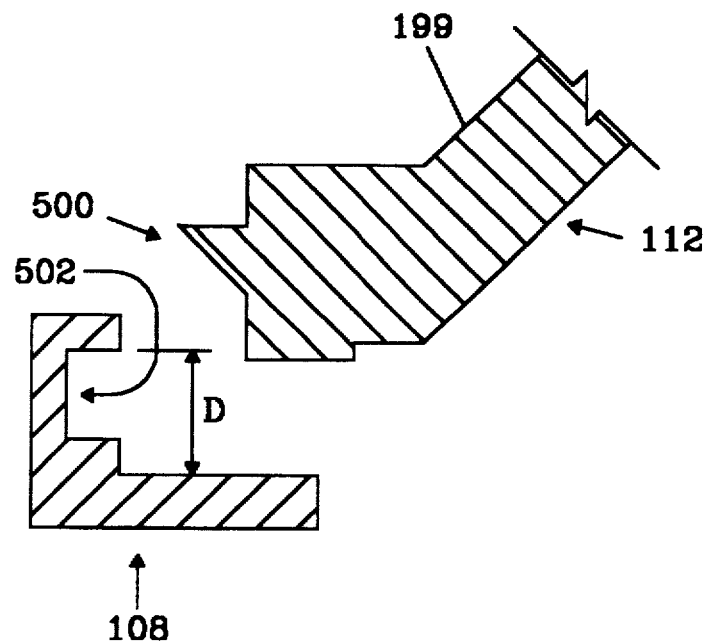
FIG. 5 is a detail of a snap-fit.

A preferred snap-fit design is shown in FIG. 5. A cross section portion of the housing 112 having a portion of a side 199 is shown featuring the detail of the beveled tongue 500 that fits into the groove 502. Dimension D is critical for a snap-fit of this design to achieve a compression of a gasket 118 of from about 0.004 in to about 0.005 in. In a preferred embodiment, the gasket 118 is a rubber having a Shore hardness of about 65 Type A, for example a butyl rubber. For a gasket thickness of about ¹⁄₁₆ in, a protective screen of about 10 mil thickness, and scintillator material having a thickness of about ¹⁄₁₆ in, plus thin metallized sheet(s) the critical dimension D is about 0.166 in.

Figure 6A:
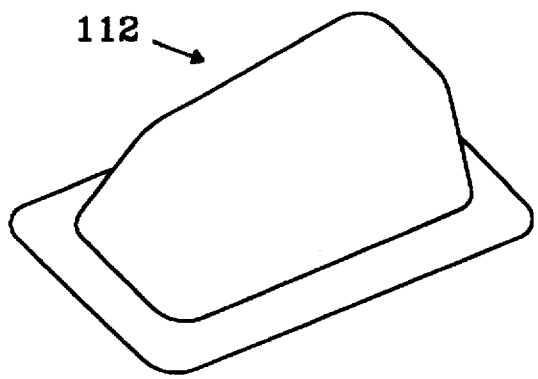
FIG. 6a is an isometric view of a housing with a curved profile.
Figure 6B:
FIG. 6b is a side view of a housing with a curved profile.
Figure 6C:
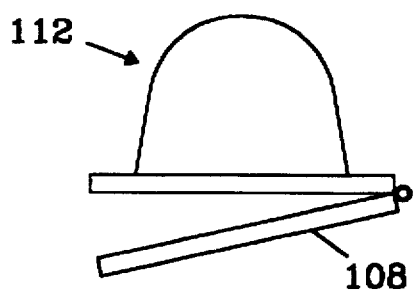
FIG. 6c is an end view of a housing with a curved profile.

An alternative housing profile is shown in FIG's 6a, 6b, and 6c wherein the housing 112 top and sides are an integral curved shape. Also shown in FIG. 6c is a retaining bracket 108 hinged to the housing 112. The hinge may be a plastic web hinge so that the housing 112 and the retaining bracket 108 are molded together as a single unit. Although shown with the integral curved shape housing, it will be apparent to one of skill in the art of plastics molding and assembly, that the retaining bracket may be hinged to a top 112 having a bi-linear profile or other shape. Further, although shown hinged to a side with a long dimension, it will be apparent that one of skill in the art of plastic molding and assembly that they could be hinged on a side with a short dimension. Alternatively, the hinge may be a pin hinge or a snap-in hinge.

Figure 7:
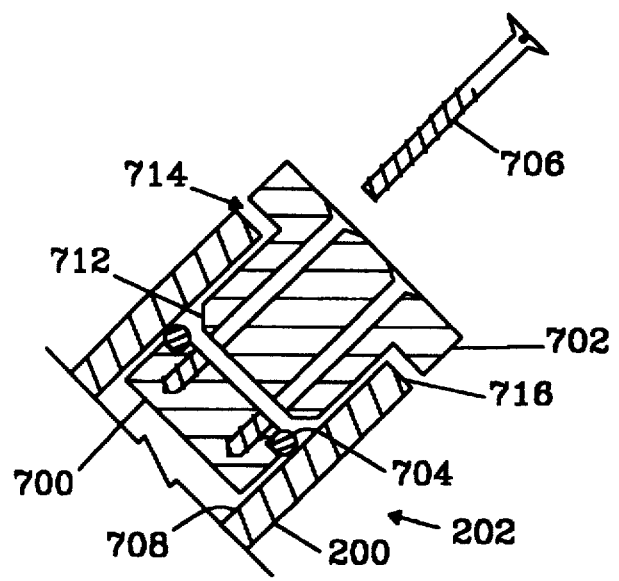
FIG. 7 is a cross section of a two-part closure.
Figure 7A:
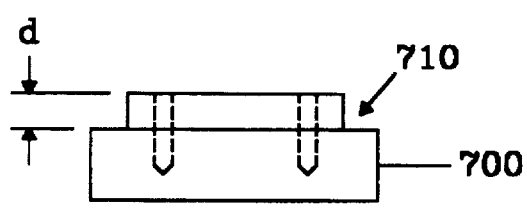
FIG. 7a is a side view of the inner part of the two-part closure.

In FIG. 7 a closure 210 which is a two-part closure is shown for the second end 202 of the cylindrical housing 200. According to the present invention the closure 210 has an inner part 700 and an outer part 702 with an o-ring 704 in between. The inner part 700 and outer part 702 are held together with screws 706. The inner part 700 and outer part 702 co-operate to compress the o-ring 704 and expand it against the inside 708 of the cylindrical housing 200, thereby providing a light tight closure without any penetration of the wall of the cylindrical housing 200. A further advantage is that the screws 706 are out of the way of a person's hand holding the cylindrical housing 200 thereby increasing sensitivity to radiation by reducing human fatigue or distraction. Additionally, matching holes between the inner part 700 and the outer part 702 is easier than matching with holes in the cylindrical housing 200. In FIG. 7a, the inner part 702 is shown with a step 710. The step has a height d that is less than a radius of the o-ring 704. The outer part 702 has a chamfer 712 that contacts the o-ring 704 urging the o-ring against the inside 708 of the cylindrical housing 200 as the screws 706 draw the inner part 700 and the outer part 702 together. The outer part 702 further has a shoulder 714 that bears on the top surface 716 of the cylindrical housing 200. It is possible to place the step 710 and o-ring 704 on the outer part 702 and the chamfer 712 on the inner part 700. However, it was found that this did not seal as well and is therefore not preferred. The reliability and light tightness of the two-part closure contributes to increased radiation sensitivity of the probe.

ANSI standard N42.17A specifies operation of survey probes in magnetic fields up to 10 gauss. According to the present invention, this was achieved by placing mu-metal around the photomultiplier tube within the cylindrical housing. In addition, the photomultiplier tube was operated at voltages from about 900 V to about 1200 V.

The active area of the survey probe may range from about 50 cm$^2$ to about 100 cm$^2$ with 100 cm$^2$ preferred. Further preferred are dimensions wherein the length is greater than the width, for example 12.5 cm×8 cm. The narrower width permits more effective surveying of curved surfaces.

It was found that the type of photomultiplier tube had little effect on performance. Thus, the flat photomultiplier tube is preferred for its lower cost compared to a 2-pi photomultiplier tube.

The protective screen must be smooth to avoid tearing the plastic sheet(s). Accordingly, a 10 mil thick copper alloy, beryllium copper, screen is preferably made by chemically etching the openings in the screen. Alternatively, the protective screen may be phosphor bronze. In this manner, there are no burrs, bumps or other perturbations in the protective screen.

The various features of the present invention may be applied singly or plurally to any survey probe for improved ergonomic comfort or performance.

Example 1

An experiment was conducted to compare the performance of the plastic housing of the present invention with the metal housings of the prior art. An ABS plastic, Magnum ABS DOW 9555, was obtained from General Polymers, La Mirada, Calif. It was combined with about 4 wt % carbon black and about 4 wt % antistatic compound Armastat 550, Akzo, Chicago, Ill. Housings, retaining brackets and heel collars were injection molded. These were assembled together with a face and protective screen. A photomultiplier tube in a cylindrical housing was inserted into the heel collar and secured to make the survey probe. The survey probe was exposed to a high intensity lamp and found to be light tight.

The survey probes were tested in a radiation environment having a gamma radiation background of 10 mR/hr. Results are shown in Table E1—1.

TABLE E1-1

| Gamma Radiation Background Signal | |
|---|---|
| Survey Probe | Gamma Radiation Background Sig. |
| Prior Art Survey Probes | |
| Bicron AB 100 | 30 counts/min/mR/hr |
| NE DP6BD | 60 counts/min/mR/hr |
| Ludlum 43-89 | 45 counts/min/mR/hr |
| Ludlum 43-1-1 | NA |
| Present Invention Survey Probe | |
| E-1302 | 30 counts/min/mR/hr |

It is believed that the low background of the Bicron AB 100 is due to its internal light pipe. It was unexpected to achieve a similarly low background for the invention in the absence of a light pipe.

Example 2

An experiment was conducted to compare the performance of the survey probe of the present invention having mu-metal surrounding the photomultiplier tube within the cylindrical housing and by operating the photomultiplier tube at a voltage between about 900 V and 1200 V with the survey probes of the prior art. The survey probe was constructed as described in Example 1.

The survey probes were tested in accordance with ANSI N42.17A in ac and dc magnetic environments of up to 10 Gauss. A thorium 230 source of nominally 5000 dpm was used to provide a reference signal.

Results are shown in Table E2-1. All of the prior art survey probes failed to provide sufficient sensitivity in the magnetic field. Only the survey probe of the present invention met the detection sensitivity criteria under magnetic field conditions.

TABLE E2-1

| Magnetic Field Effect on Response of Survey Probe | |
|---|---|
| Survey Probe | Survey Probe Response in Magnetic Field |
| Prior Art Survey Probes | |
| Bicron AB 100 | NA |
| NE DP6BD | +150% of nominal to 0 counts/min |
| Ludlum 43-89 | −10 to −95% |
| Ludlum 43-1-1 | NA |
| Present Invention Survey Probe | |
| E-1302 | ±20% |

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A survey probe for surveying ionizing radiation, having:

(a) a housing made of a first optically opaque plastic, the housing having a top, a nose, a bottom, sides and a heel, said top extending from the nose to the heel, and said sides extending from said top to said bottom, interior surfaces of said top, nose, heel and sides are optically reflective;

(b) a face having a scintillation material made of a plastic sheet coated with a scintillator on a sheet face of the plastic sheet, said sheet face covered with a thin metallic sheet;

(c) a retaining bracket holding said face onto the bottom of said housing together with a gasket between said retaining bracket and said face;

(d) a protective grid or screen placed over the thin metallic sheet to protect it from abrasion and tearing during surveying as the face of the survey probe is passed over surfaces which are often not geometrically flat or uniform; and (e) a cylindrical housing containing a photomultiplier tube, said cylindrical housing attached to the housing; wherein the improvement comprises:
the optically opaque plastic of the housing has an anti-static compound.

2. The survey probe as recited in claim 1, wherein said top approximates a parabola.

3. The survey probe as recited in claim 2, wherein said top has a bi-linear profile approximating said parabola.

4. The survey probe as recited in claim 2, wherein said housing has a curved profile wherein said top and said sides are combined.

5. The survey probe as recited in claim 1, wherein said first optically opaque plastic is a plastic base mixed with carbon black.

6. The survey probe as recited in claim 5, wherein the carbon black is in an amount from about 1 wt % to about 5 wt %.

7. The survey probe as recited in claim 5, wherein the plastic base is selected from the group consisting of ABS, HDPE, polysulfone, epoxy, and combinations thereof.

8. The survey probe as recited in claim 1, wherein the cylindrical housing is attached to said heel and said photomultiplier tube extending to at least flush with the internal surface of said heel, said cylindrical housing having a closure on a second end.

9. The survey probe as recited in claim 8, further comprising an o-ring holder having a heel collar attached to said heel of said housing for receiving said cylindrical housing.

10. The survey probe as recited in claim 9, wherein said heel collar is made of a second optically opaque plastic.

11. The survey probe as recited in claim 10, wherein said second optically opaque plastic is the same as said first optically opaque plastic.

12. The survey probe as recited in claim 8, wherein said closure is a two-part closure having an inner part and an outer part with an o-ring therebetween, said inner part and said outer part connected with at least one screw wherein said screw draws said inner part and said outer part together thereby compressing said o-ring against an inside surface of said cylindrical housing, thereby providing a light tight seal.

13. The survey probe as recited in claim 12, wherein said inner part has a step having a height less than a radius of said o-ring.

14. The survey probe as recited in claim 12, wherein said outer part has a chamfer that contacts said o-ring.

15. The survey probe as recited in claim 1, wherein said retaining bracket is made of a second optically opaque plastic.

16. The survey probe as recited in claim 1, further comprising mu metal surrounding said photomultiplier tube within said cylindrical housing.

17. A survey probe for surveying ionizing radiation, having:

(a) a housing having a top, a nose, a bottom, sides and a heel, said top extending from the nose to the heel, and said sides extending from said top to said bottom, interior surfaces of said top, nose, heel and sides are optically reflective;

(b) a face having a scintillation material made of a plastic sheet coated with a scintillator on a sheet face of the plastic sheet, said sheet face covered with a thin metallic sheet;

(c) a retaining bracket holding said face onto the bottom of said housing together with a gasket between said retaining bracket and said face;

(d) a protective grid or screen placed over the thin metallic sheet to protect it from abrasion and tearing during surveying as the face of the survey probe is passed over surfaces which are often not geometrically flat or uniform; and (e) a cylindrical housing containing a photomultiplier tube, said cylindrical housing attached to said heel and said photomultiplier tube extending to at least flush with the internal surface of said heel, said cylindrical housing having a closure on a second end;

wherein the improvement comprises:
(f) said housing and said retaining bracket made of an optically opaque plastic;
(g) said housing and said bracket are attached with a snap-fit;
(h) said top having a profile approximating a parabola; and
(I) said optically opaque plastic having an anti-static compound.

18. The survey probe as recited in claim 17, further comprising:
a mu-metal surrounding said photomultiplier tube within said cylindrical housing.

19. The survey probe as recited in claim 17, wherein said optically opaque plastic is a plastic base mixed with carbon black.

20. The survey probe as recited in claim 19, wherein said plastic base is selected from the group consisting of ABS, HDPE, polysulfone, epoxy, and combinations thereof.

21. The survey probe as recited in claim 17, wherein said profile is a bi-linear profile.

22. The survey probe as recited in claim 17, wherein said profile is a curved profile.

23. The survey probe as recited in claim 17, wherein said closure is a two-part closure.

24. The survey probe as recited in claim 23, wherein said two-part closure has an inner part and an outer part with an o-ring therebetween, said inner part and said outer part connected with at least one screw wherein said screw draws said inner part and said outer part together thereby compressing said o-ring against an inside surface of said cylindrical housing, thereby providing a light tight seal.

25. The survey probe as recited in claim 24, wherein said inner part has a step having a height less than a radius of said o-ring.

26. The survey probe as recited in claim 24, wherein said outer part has a chamfer that contacts said o-ring.

27. A housing for a scintillation survey probe made of an optically opaque plastic, the housing having a top, a nose, a bottom, sides and a heel, said top extending from the nose to the heel, and said sides extending from said top to said bottom, interior surfaces of said top, nose, heel and sides are optically reflective, said bottom being attachable to a scintillator, wherein the improvement comprises:

said optically opaque plastic having an anti-static compound.

28. The housing as recited in claim 27, wherein said top has a profile approximating a parabola.

29. The housing as recited in claim 28, wherein said profile is a curved profile wherein said top and said sides are combined in a single curved shape.

30. The housing as recited in claim 28, wherein said profile is a bi-linear profile.

31. The housing as recited in claim 27, wherein said optically reflective surfaces comprise a coating of a chrome paint on said interior surfaces.

32. The housing as recited in claim 27, wherein a retaining bracket for said scintillator is hinged to said housing.

33. A survey probe for surveying ionizing radiation, having:
 (a) a housing having a top, a nose, a bottom, sides and a heel, said top extending from the nose to the heel, and said sides extending from said top to said bottom, interior surfaces of said top, nose, heel and sides are optically reflective;
 (b) a face having a scintillation material made of a plastic sheet coated with a scintillator on a sheet face of the plastic sheet, said sheet face covered with a thin metallic sheet;
 (c) a retaining bracket holding said face onto the bottom of said housing together with a gasket between said retaining bracket and said face;
 (d) a protective grid or screen placed over the thin metallic sheet to protect it from abrasion and tearing during surveying as the face of the survey probe is passed over surfaces which are often not geometrically flat or uniform; and
 (e) a cylindrical housing containing a photomultiplier tube attached to the housing;
 wherein the improvement comprises: mu-metal surrounding said photomultiplier tube within said cylindrical housing.

34. The survey probe as recited in claim 33, wherein said housing is an optically opaque plastic having an anti-static compound.

35. A survey probe for surveying ionizing radiation, having:
 (a) a housing made of a first optically opaque plastic, the housing having a top, a nose, a bottom, sides and a heel, said top extending from the nose to the heel, and said sides extending from said top to said bottom, interior surfaces of said top, nose, heel and sides are optically reflective;
 (b) a face having a scintillation material made of a plastic sheet coated with a scintillator on a sheet face of the plastic sheet, said sheet face covered with a thin metallic sheet;
 (c) a retaining bracket holding said face onto the bottom of said housing together with a gasket between said retaining bracket and said face;
 (d) a protective grid or screen placed over the thin metallic sheet to protect it from abrasion and tearing during surveying as the face of the survey probe is passed over surfaces which are often not geometrically flat or uniform; and
 (e) a cylindrical housing containing a photomultiplier tube attached to the housing;
 wherein the improvement comprises: said top approximates a parabola.

36. The survey probe as recited in claim 35, wherein said top has a bi-linear profile approximating said parabola.

37. The survey probe as recited in claim 35, wherein said housing has a curved profile wherein said top and said sides are combined.

38. A survey probe for surveying ionizing radiation, having:
 (a) a housing having a top, a nose, a bottom, sides and a heel, said top extending from the nose to the heel, and said sides extending from said top to said bottom, interior surfaces of said top, nose, heel and sides are optically reflective;
 (b) a face having a scintillation material made of a plastic sheet coated with a scintillator on a sheet face of the plastic sheet, said sheet face covered with a thin metallic sheet;
 (c) a retaining bracket holding said face onto the bottom of said housing together with a gasket between said retaining bracket and said face;
 (d) a protective grid or screen placed over the thin metallic sheet to protect it from abrasion and tearing during surveying as the face of the survey probe is passed over surfaces which are often not geometrically flat or uniform; and
 (e) a cylindrical housing containing a photomultiplier tube, said cylindrical housing attached to said housing, said cylindrical housing having a closure on a second end;
 wherein the improvement comprises:
  said closure is a two-part closure having an inner part and an outer part with an o-ring therebetween, said inner part and said outer part connected with at least one screw wherein said screw draws said inner part and said outer part together thereby compressing said o-ring against an inside surface of said cylindrical housing, thereby providing a light tight seal.

39. The survey probe as recited in claim 38, wherein said inner part has a step having a height less than a radius of said o-ring.

40. The survey probe as recited in claim 38, wherein said outer part has a chamfer that contacts said o-ring.

* * * * *